Jan. 29, 1929.
O. C. L. HIRSCH
1,700,131
SAUSAGE LINKING AND TWISTING MACHINE
Filed Sept. 4, 1924
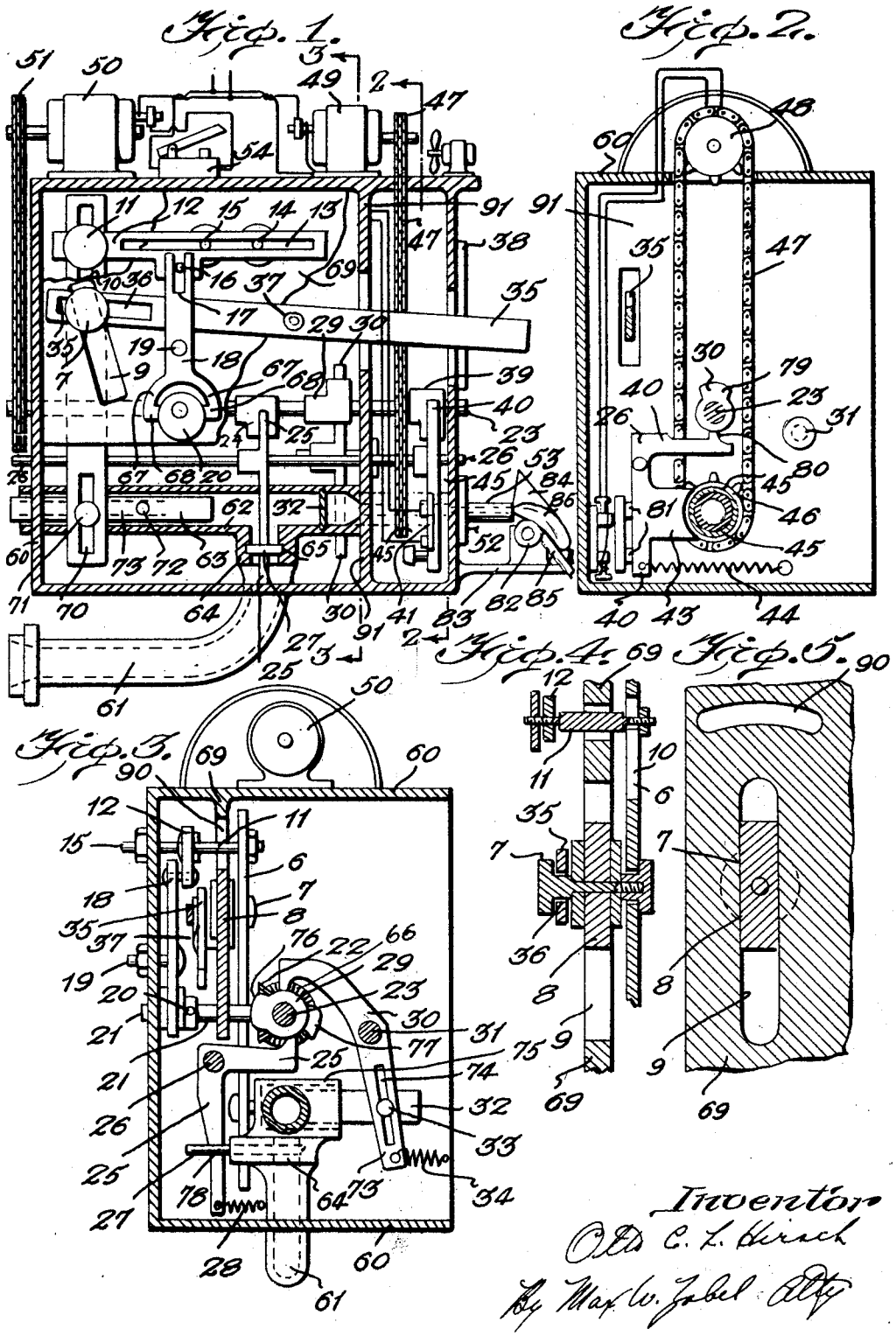
Inventor
O. C. L. Hirsch
By Max W. Zabel Atty Patented Jan. 29, 1929.

1,700,131

UNITED STATES PATENT OFFICE.

OTTO C. L. HIRSCH, OF CHICAGO, ILLINOIS.

SAUSAGE LINKING AND TWISTING MACHINE.

Application filed September 4, 1924. Serial No. 735,861.

My invention relates to sausage linking machines and more particularly to a sausage linking device that is adapted to be used in combination with a stuffer.

It is the purpose of my invention to provide a sausage linking device that is adapted to be attached to the outlet of a stuffer, said linking device twisting each sausage after the same has been filled by the stuffer. It has been customary previously to stuff an entire casing and then link the same. In the present invention instead of doing this, the amount of meat necessary to form one link from the casing is admitted to the casing and then the casing is twisted to form the link. After this link has been formed more meat is admitted of a quantity sufficient to fill the next link after which this second link is twisted and so on until the entire casing has been stuffed and linked.

It has been found that in devices of this character it is difficult to get the links of uniform length, and it is the purpose of my invention to provide a sausage linking device of the above mentioned character wherein the links will be made of a uniform length although the casings may be of different texture and quality and of different diameters in different portions thereof.

In order to accomplish this purpose I have provided a passageway leading from the outlet of the stuffer to the twisting mechanism which is provided with valve mechanism that is alternately opened and closed so as to admit the meat to the casing while the same is not being rotated to twist or link the same, and to shut off the supply of meat while the casing is being rotated and to provide means in said passageway for regulating the amount of meat passing through the tube in accordance with the quality, size and condition of the casing that is being stuffed.

It is the further purpose of the invention to provide a device of the above mentioned character in which a reciprocable member is provided in the passageway, the stroke of which can be varied to vary the amount of meat fed through the passageway to the sausage casing. The reciprocable means is preferably a piston and the valve mechanism is so related to the reciprocable member that the valve for admitting the sausage meat into the casing in front of the reciprocable member is open when the reciprocable member is moved in a feeding direction and a second valve is provided that opens when the reciprocable member is returned in the opposite direction.

It is still another purpose of the invention to provide means for feeding the sausage meat to the casing that is constantly under the control of the operator of the machine to vary the amount of meat fed as desired to obtain links of the same length throughout the length of the casing. Said means is preferably a hand lever that is within easy reach of the operator and which controls the stroke of the piston or other reciprocable member for feeding meat into the sausage casing which is mounted on the twisting mechanism.

It is still another purpose of the invention to provide means for twisting the links comprising a rotatable member upon which the unfilled casing is mounted, which is rotated only when no meat is being fed into the casing and which is held stationary when meat is being fed into the casing; said rotatable member being operated by separate driving means from the driving means for the feeding mechanism but being controlled by the operation of the feeding mechanism so as to start when the feeding mechanism is not feeding and to stop when the feeding mechanism begins to feed.

The means for operating the machine preferably comprises a pair of motors one of which drives the feeding mechanism and the other of which drives the twisting mechanism. The means for controlling the operation of the motor driving the twisting mechanism preferably is a rotatable switching means for controlling the current supply to the twisting mechanism motor and a brake mechanism that is applied when the switching mechanism interrupts the current to the motor and when the feeding mechanism begins to feed meat to the casing.

It is another purpose of the invention to provide means for receiving the linked sausage casing comprising a roller over which the casing is adapted to travel after being linked, and guide means or guards on opposite sides of said roller. The roller is preferably grooved and the casing is suspended from or depends below the roller on the opposite side thereof from the twisting mechanism.

Other objects and advantages of the invention will appear as the description of the accompanying drawings proceeds. However, I desire to have it distinctly understood that I do not intend to limit myself to the exact details shown or described but that I intend to include as part of my invention all such obvious changes and modification of parts as would occur to a person skilled in this art and as would fall within the scope of the claims.

In the drawings:

Figure 1 is a view partly in longitudinal section and partly in elevation, certain portions thereof being broken away, of my improved sausage linking attachment;

Fig. 2 is a section thereof taken on line 2—2 of Fig 1;

Fig. 3 is a section taken on line 3—3 of Fig. 1;

Fig. 4 is an enlarged section taken on line 4—4 of Fig. 1; and

Fig. 5 is an enlarged sectional view through the partition running lengthwise of the device taken at rights angles to Fig. 4.

Referring in detail to the drawings, the machine comprises a frame work 60 which is box-like in form and through the bottom of which extends a tube 61 which leads from the stuffer which is not shown. The stuffer as is well known, supplies the meat under pressure sufficient to fill a sausage casing which is to be twisted, filling the whole casing at one time. The tube 61 leads to a tube 62 in which is mounted a reciprocable member 63 which is slidably mounted therein and which acts as a piston for feeding the meat through the tube 62. The member 62 has an extension substantially at right angles to the tube 61 where the same connects therewith, a connecting nipple 64 being provided within which is mounted a valve member 27, the member 27 being suitably mounted for sliding movement in a guideway 65. The valve member 27 is driven by means of an oscillating lever 25 which is freely rotated on a shaft 26 and which is driven by means of a cam 24 provided on the main drive shaft 23 which is driven by means of the sprocket chain 51 from a motor 50 provided on the top of the frame work.

The main drive shaft 23 is also provided with a bevel gear 66 that meshes with the bevel gear 22 on the shaft 21 that is provided with an eccentric 20 with which the forked end portion 67 of the lever 18 engages, said end portion 67 being provided with curved faced shoes 68 engaging with the curved face of the eccentric 20. The lever 18 is mounted on a pivot 19 and it will be obvious that the rotation of the eccentric 20 will cause an oscillation of the lever 18 around its pivot 19. The opposite end of the lever 18 is forked so as to provide a central slot 17 within which engages a pin 16 provided on a reciprocable bar 12 which is provided with a longitudinal slot 13 receiving the guide pins 14 and 15. The bar 12 has a pivot pin 11 projecting laterally therefrom which extends through a curved slot 90 in the longitudinally extending partition 69. Said pivot pin 11 also extends through a longitudinally extending slot 10 in the bar 6 which is provided with a slot 70 at the opposite end thereof through which extends a pin 71 which is fixed on the reciprocable member 63. The reciprocable member is further provided with a guide pin 72 extending through guide slots 73 in the tube 62 for guiding the longitudinal sliding movement thereof in the member 62.

The member 6 is provided with a pivot pin 7 that is mounted on a slide 8 operating in the slot 9 in the partition 69. The said pivot pin 7 further extends through the slot 36 in the bar or lever 35 which is pivotally mounted at 37 on the partition 69. It will be seen that by shifting the lever 35 the pivot member 7 can be shifted, thus moving the pivot pin of the lever 6 and thereby changing the stroke of the piston 63. It will be obvious that oscillation of the member 18 causes reciprocation of the member 12 and oscillation of the member 6 in turn causes reciprocation of the member 63. Due to the provision of the slots 10 and 70 the member 6 can be shifted lengthwise with its pivot 7 within the range necessary for adjusting the stroke of the piston 63.

The shaft 23 is further provided with a cam 29 that engages one end of a lever 30 that is pivotally mounted on the shaft 31, extending from the transverse partition 91, and which is provided with a slot 74 in which the pin 33 pivoted on the slidable valve member 32 is engaged. The slidable valve member 32 is slidably in a guideway 75 provided in the member 62.

Upon referring to Fig. 3 it will be obvious that when the high portion 76 on the cam 29 engages with the end of the lever 30 the valve 32 will be moved inwardly or into closing position, and that when the end of the lever 30 leaves the high portion 76 of the cam the spring 34 will move the lever and the valve member 32 in the opposite direction to again open the valve.

Cam 24 is provided with a high portion 77 that is adapted to engage with the end of the lever 25, which lever is connected with the valve member 27 by passing through a suitable slot 78 in the member 27 so as to reciprocate said member as the lever is oscillated, it being obvious that the member 27 will be moved to open position when the high portion 77 engages with the end thereof which will be substantially at the time when the high portion of the cam 29 engages with the lever 30. Spring 28 is provided for returning the valve 27 to a closing position and for holding the end of the lever 25 in engagement with the cam 24. The arrangement of the parts is furthermore such that when the eccentric 20 moves the reciprocable member 63 to the right the valve 32 is opened by its cam and the valve 27 is closed by its cam, while when the reciprocable member 63 is being moved to the left the valve 32 is closed and the valve 27 is open.

By providing the arrangement described the amount of meat fed by each stroke of the member 63 can be regulated, this being dependent upon the length of the stroke and not in any way dependent upon the pressure of the meat in the stuffer or in the tube 61.

The position of the lever 35 of course determines the stroke of the member 63. In order to hold the member 35 in adjusted position a rack 38 is mounted on the end wall of the frame 60 and the bar or lever 35 is adapted to engage therewith to hold the same in fixed position.

The shaft 23 is further provided with a cam 39 having a high portion 79 that engages with a finger 80 provided on a bell crank lever 40 that is pivotally mounted on the shaft 26 and which is provided with a contact member 41 mounted on suitable supports 81 which are adapted to bridge the contacts 42 that are adapted to complete the circuit to a motor 49 provided with a sprocket wheel 48 on the shaft thereof over which passes the sprocket chain 47 which passes over the sprocket wheel 46 provided on the twisting member 45. The member 45 is provided with a cylindrical outer face with which the curved brake shoe 43 provided on the member 40 is adapted to engage due to the action of the spring 44 which tends to move the member 40 in an opposite direction to which it is moved by means of the cam 39. Thus when the high portion 79 of the cam 39 engages with the finger 80 the circuit to the motor 49 is closed and the member 45 is rotated, while when the finger 80 is traveling over the low portion of the cam the spring 44 holds the brake shoe 43 in engagement with the outer face of the member 45. Cam 39 is so placed relatively to the cams 24 and 29 and the eccentric 20 that the brake will be on when the reciprocable member 63 is feeding meat to the casing and the valve 32 is open, while the motor 49 will be rotating the member 45 when the valve 32 is closed and the member 63 is returning to the feeding position. Thus a sausage casing 53 mounted on the sausage casing receiving member 52 provided on the member 45 will be fed with meat while the member 45 is stationary and the meat supplied thereto will be shut off when the member 45 is rotated. The casing may be held by hand by the operator or may be allowed to travel over a roller 82 provided on the bracket 83 on the framework, said roller 82 being grooved and being provided with guide members 84 on opposite sides thereof. If desired a guide 85 may be provided on the opposite side of the roller 82 from the twisting mechanism and the filled and linked sausages 86 will hang down from the roller 82 on the support or guide 85 and will normally not rotate with the rotatable member 45. A suitable switch 54 is provided for throwing both motors 49 and 50 into operation, the motor 50 rotating constantly and the motor 49 being under the control of the switching mechanism comprising the members 41 and 42.

Having thus described my invention, what I desire to claim and secure by United States Letters Patent is:

1. In a device of the character described, means for containing meat under pressure, a passageway leading therefrom, a twisting mechanism, means in said passageway periodically halting the flow of meat therethrough, and reciprocable means adjustable while in motion in said passageway for feeding meat therethrough.

2. In a device of the character described, means for containing meat under pressure, a passageway leading therefrom, a twisting mechanism, means in said passageway periodically halting the flow of meat therethrough, reciprocable means in said passageway for feeding meat therethrough, and means for adjusting the stroke of said reciprocable means without stopping the reciprocation to vary the amount of meat fed by each stroke thereof.

3. In a device of the character described, means for containing meat under pressure, a passageway leading therefrom, a twisting mechanism, means in said passageway periodically halting the flow of meat therethrough, a piston in said passageway for feeding meat therethrough, and means for adjusting the stroke of said piston while in motion to vary the amount of meat fed by each stroke thereof.

4. In a device of the character described, a twisting mechanism, meat feeding mechanism, means for periodically operating said meat feeding mechanism, means for periodically rotating said twisting mechanism independently of said meat feeding mechanism, and means operated by said meat feeding mechanism operating means controlling the operation of the means for rotating said twisting mechanism.

5. In a device of the character described, a twisting mechanism, meat feeding mechanism, means for periodically operating said meat feeding mechanism, means for periodically rotating said twisting mechanism independently of said meat feeding mechanism, and means operated by said meat feeding mechanism operating means controlling the operation of the means for rotating said twisting mechanism, said controlling means stopping the rotation of said twisting mechanism when said meat feeding means is operating and rotating the same when said feeding means is not feeding meat to the twisting mechanism.

6. In a device of the character described, a twisting mechanism, meat feeding mechanism, means for periodically operating said meat feeding mechanism, means for periodically rotating said twisting mechanism independently of said meat feeding mechanism, and means operated by said meat feeding mechanism operating means controlling the operation of the means for rotating said twisting mechanism, said controlling means comprising a brake for stopping the rotation of said twisting mechanism when said meat feeding means is operating and rotating the same when said feeding means is not feeding meat to the twisting mechanism.

7. In a device of the character described, a twisting mechanism, meat feeding mechanism, means for periodically operating said meat feeding mechanism, means for periodically rotating said twisting mechanism independently of said meat feeding mechanism, and means operated by said meat feeding mechanism operating means controlling the operation of the means for rotating said twisting mechanism, said controlling means comprising a brake for stopping the rotation of said twisting mechanism when said meat feeding means is operating, and a motor and switching means controlling the motor for rotating the same.

8. In a device of the character described, a twisting mechanism, meat feeding mechanism, means for periodically operating said meat feeding mechanism, means for periodically rotating said twisting mechanism independently of said meat feeding mechanism, and means operated by said meat feeding mechanism operating means controlling the operation of the means for rotating said twisting mechanism, said feeding mechanism comprising a container for meat under pressure, a chamber having a piston reciprocating therein, a valve for opening said chamber to said container when said piston is moving in one direction and a valve for opening the chamber to the twisting mechanism when the piston moves in the opposite direction.

9. In a device of the character described, a twisting mechanism, meat feeding mechanism, means for periodically operating said meat feeding mechanism, means for periodically rotating said twisting mechanism independently of said meat feeding mechanism, and means operated by said meat feeding mechanism operating means controlling the operation of the means for rotating said twisting mechanism, said feeding mechanism comprising a container for meat under pressure, a chamber having a piston reciprocating therein, a slidable valve for opening said chamber to said container when said piston is moving in one direction and a slidable valve for opening the chamber to the twisting mechanism when the piston moves in the opposite direction.

10. In a device of the character described, a twisting mechanism and means for feeding meat to said twisting mechanism comprising a reciprocable member, a rotating shaft, an eccentric thereon, a member embracing said eccentric and means connecting said eccentric with said piston whereby rotation of said eccentric reciprocates said piston.

11. In a device of the character described, a twisting mechanism and means for feeding meat to said twisting mechanism comprising a reciprocable member, a rotating shaft, an eccentric thereon, a pivoted arm embracing said eccentric, and a link mechanism connecting said member with said piston whereby rotation of said eccentric reciprocates said piston.

12. In a device of the character described, a twisting mechanism and means for feeding meat to said twisting mechanism comprising a reciprocable member, a rotating shaft, an eccentric thereon, a pivoted arm embracing said eccentric, and a link mechanism connecting said member with said piston whereby rotation of said eccentric reciprocates said piston, said link mechanism comprising a pivoted lever, and means for shifting the pivot thereof to vary the stroke of the reciprocable member.

13. In a device of the character described, a twisting mechanism comprising a rotatable casing receiving tube, means for feeding meat through said tube to said casing and means for supporting the linked sausages comprising a roller, said sausages being freely draped over said roller.

14. In a device of the character described, a twisting mechanism comprising a rotatable casing receiving tube, means for feeding meat through said tube to said casing and means for supporting the linked sausages comprising a grooved roller, said sausages engaging the roller by gravity and being free above said roller.

15. In a device of the character described, a twisting mechanism comprising a rotatable casing receiving tube, means for feeding meat through said tube to said casing and means for supporting the linked sausages comprising a grooved roller, and stationary guide members on opposite sides of said roller.

In witness whereof, I hereunto subscribe my name this 29th day of August, A. D. 1924.

OTTO C. L. HIRSCH.